US012657202B1

(12) United States Patent
Siragusa et al.

(10) Patent No.: US 12,657,202 B1
(45) Date of Patent: Jun. 16, 2026

(54) TRANSACTIONALLY DERIVED METADATA FOR REFRESHING LOCAL MATERIALIZED VIEWS WITH EXTERNAL TABLE SOURCES

(71) Applicant: Amazon Technologies, Inc., Seattle, WA (US)

(72) Inventors: Enrico Siragusa, Berlin (DE); Gaurav Saxena, Cupertino, CA (US); Andre Hernich, Berlin (DE); Artem Honcharov, Berlin (DE); Mario Guerriero, Berlin (DE); Panagiotis Parchas, Berlin (DE); Hinnerk Gildhoff, Hamburg (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/620,904

(22) Filed: Mar. 28, 2024

(51) Int. Cl.
    *G06F 16/20*      (2019.01)
    *G06F 16/23*      (2019.01)
    *G06F 16/25*      (2019.01)

(52) U.S. Cl.
    CPC ........ *G06F 16/254* (2019.01); *G06F 16/2379* (2019.01)

(58) Field of Classification Search
    None
    See application file for complete search history.

(56) References Cited

U.S. PATENT DOCUMENTS

| | | | |
|---|---|---|---|
| 11,080,257 B2 | 8/2021 | Cseri | |
| 11,347,734 B1 | 5/2022 | de Nijs | |
| 11,561,976 B1 | 1/2023 | Buchmann | |
| 11,841,849 B2 | 12/2023 | Muralidhar | |
| 12,277,115 B2 * | 4/2025 | Rajaperumal | ..... G06F 16/24539 |
| 12,339,848 B2 * | 6/2025 | Cella | ..................... G06F 16/278 |
| 2015/0074151 A1 | 3/2015 | Chaiken | |
| 2015/0356158 A1 | 12/2015 | Potapov | |
| 2016/0092524 A1 | 3/2016 | Shivarudraiah | |
| 2020/0334231 A1 | 10/2020 | Muralidhar | |
| 2020/0334241 A1 | 10/2020 | Muralidhar | |
| 2022/0179864 A1 | 6/2022 | Jaiswal | |
| 2022/0277006 A1 | 9/2022 | O'Krafka | |
| 2022/0374404 A1 * | 11/2022 | Johnson | .............. G06F 16/2246 |
| 2022/0382758 A1 | 12/2022 | Schreter | |
| 2024/0143548 A1 * | 5/2024 | Akidau | ................. G06F 16/116 |
| 2025/0252135 A1 * | 8/2025 | Bourbie | ............ G06F 16/90328 |

OTHER PUBLICATIONS

U.S. Appl. No. 18/622,201, filed Mar. 29, 2024, Enrico Siragusa.

* cited by examiner

*Primary Examiner* — Jau Shya Meng
(74) *Attorney, Agent, or Firm* — S. Scott Foster; Kowert, Hood, Munyon, Rankin & Goetzel, P.C.

(57) ABSTRACT

Metadata for external table sources of a local materialized view is transactionally derived. An update to the metadata is identified. Data objects storing respective portions of external tables are determined according to the update to the metadata. The data objects are accessed to obtain data from the external tables in order to update the local materialized view.

20 Claims, 8 Drawing Sheets

Identify, by a database system, an update to metadata that is transactionally derived for one or more external tables stored in an external data storage system, where the external table(s) are a source for a local materialized view maintained by the database system
610

Determine data object(s) storing respective portions of the external table(s) in the external data storage system to access according to the identified update to the local copy of the metadata
620

Update the local materialized view maintained by the database system according to the accessed data object(s) storing the respective portions of the external table(s)
630

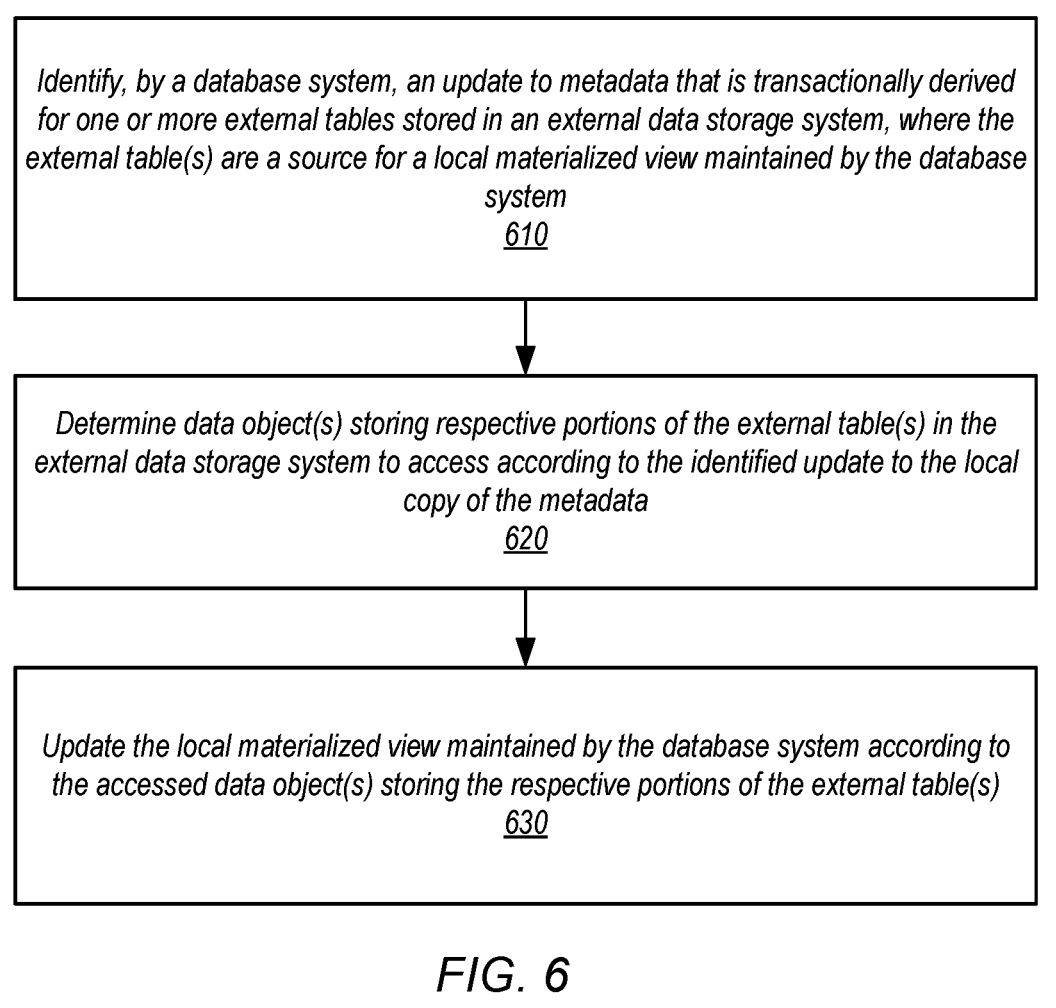

Identify, by a database system, an update to metadata that is transactionally derived for one or more external tables stored in an external data storage system, where the external table(s) are a source for a local materialized view maintained by the database system
610

Determine data object(s) storing respective portions of the external table(s) in the external data storage system to access according to the identified update to the local copy of the metadata
620

Update the local materialized view maintained by the database system according to the accessed data object(s) storing the respective portions of the external table(s)
630

FIG. 6

*Detect a refresh event for a local materialized view with external table(s) as source(s)*
*710*

*Perform an access request to an external data storage system that stores the external table(s)*
*720*

*Determine, based on a result of the access request, difference(s) with metadata derived for the external table(s)*
*730*

*Perform transaction(s) on the metadata to apply the difference(s)*
*740*

TRANSACTIONALLY DERIVED METADATA FOR REFRESHING LOCAL MATERIALIZED VIEWS WITH EXTERNAL TABLE SOURCES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing. For example, data processing resources may be efficiently configured to perform different workloads. However, given that many workloads are unknown when data processing resources are configured, or change over time. Challenges in obtaining the right configuration of data processing resources occur frequently.

BRIEF DESCRIPTION OF THE DRAWINGS

FIG. 6 is a high-level flowchart illustrating methods and techniques to implement transactionally derived metadata for refreshing local materialized views with external table sources, according to some embodiments.

Figure 1:
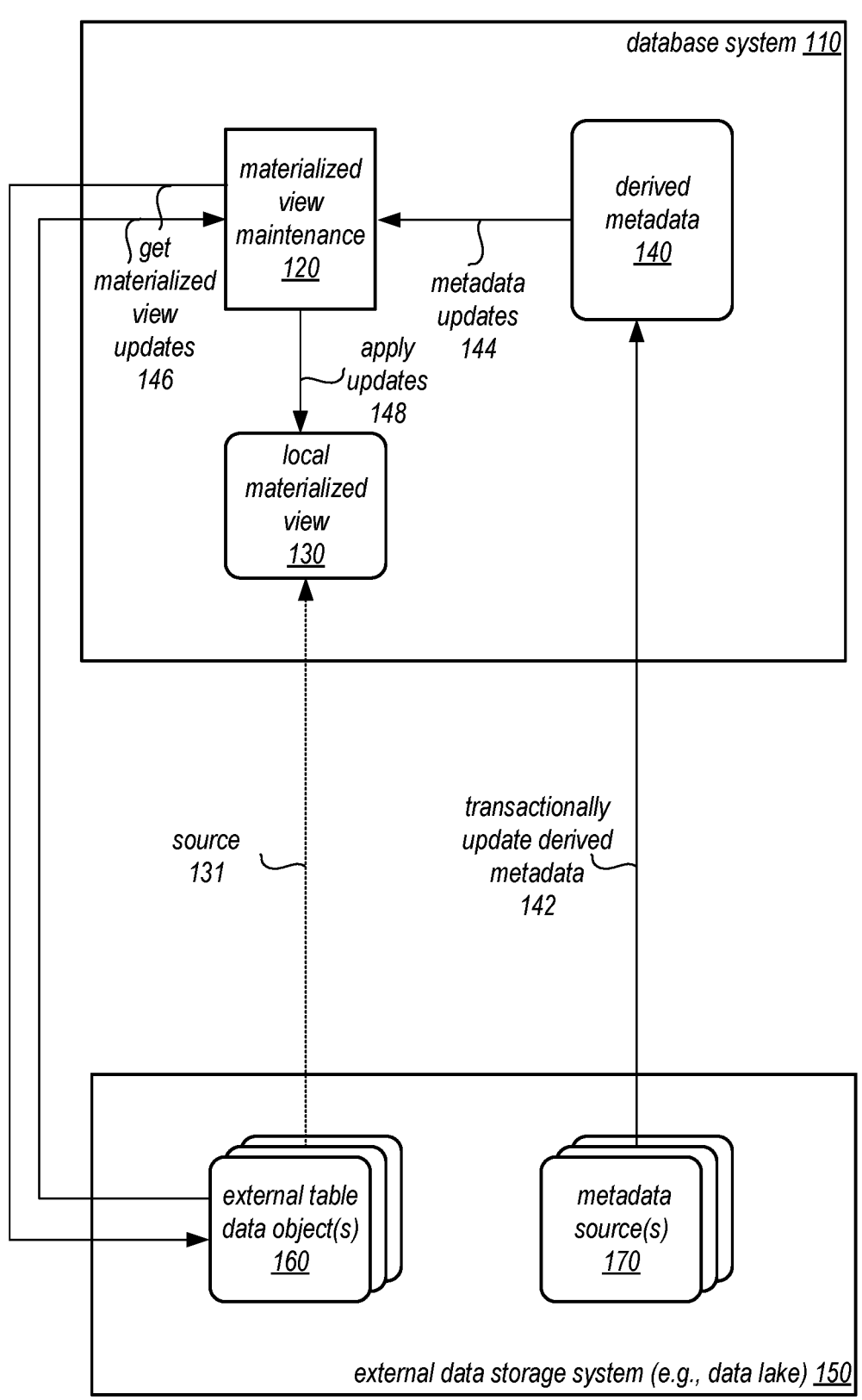
FIG. 1 illustrates a logical block diagram of transactionally derived metadata for refreshing local materialized views with external table sources, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Materialized views offer improved database system performance by combining data from one or more sources into a view, such as a table, that can be access more quickly than the underlying sources. Use of materialized can improve the performance of queries, for example, and can be explicitly referenced in a query or automatically used to perform a query even when the query did not specify the materialized views.

As database systems interact with further sources of data, database systems may leverage the storage capabilities of other data storage systems to store data that can then be used or accessed by the database system without using database system resources (e.g., storage capacity) to store the data. For example, some database systems may support the use of external tables, which may be tables that are specified, identified to, or otherwise treated as a table like tables of data that are stored internally as part of a database system, but are actually stored in a separate, external data storage system. These external tables may be sources of materialized views, in some embodiments.

Because materialized views offer performance improvements to queries and/or other database system operations, increasing the usage of materialized views can increase the performance improvements achieved at the database system. Materialized views, however, can grow stale or otherwise become out of date as data in the sources used to create the materialized view may have changed. As a materialized view creates a duplicate of data from one or more sources, techniques to refresh or otherwise bring a materialized view up to date may be performed. Such techniques, however, may have to account for scenarios when external tables are sources of the materialized view.

For example, external data storage systems may store data of external tables in various file formats which may or may not be native (e.g., directly accessible) by a database system. These file formats may also support various ways of interacting with the external tables in order to, for example, add, remove or modify data in the external data tables. For example, an external table may be stored as different partitions corresponding to time ranges (e.g., months), locations (e.g., states or territories), or other values of a column in the external table. New partitions may be added, older partitions deleted, or other changes made. These changes may be made transactionally for file formats that are transactional file formats. For instance, transactional file formats may support transactional operations and ensure that data in the external table is accurate, consistent, and supports tracking how data and data structure changes over time. These properties are collectively known as Atomicity, Consistency, Isolation, and Durability (ACID): Atomicity guarantees that each transaction is a single event that either succeeds or fails completely. Consistency ensures that all data written is valid according to the defined rules of the data lake, ensuring that data is accurate and reliable. Isolation ensures multiple transactions can occur at the same time without interfering with each other, ensuring that each transaction executes independently. Durability means that data is not lost or corrupted once a transaction is submitted. Data can be recovered in the event of a system failure, such as a power outage. Some file formats, however, may be non-transactional, which do not support transactional updates to the external table in the storage system of the external table.

Various techniques for transactionally derived metadata for refreshing local materialized views with external table sources are described herein. Such techniques may improve the performance of database systems by efficiently identifying when and how to update materialized views that use external tables as sources. For example, such techniques may be performed independently of the file format used to store the external table in the external data storage system. In this way, the various types of external tables that can be externally stored can be used as sources of a materialized view without degrading database system performance when it is time to refresh the materialized view.

FIG. 1 illustrates a logical block diagram of transactionally derived metadata for refreshing local materialized views with external table sources, according to some embodiments. Database system 110 may be a standalone database system or a service, such as database service 110. Database system 110 may store and/or provide access to various data sets, including materialized views, like local materialized view 130 that may be created for subsequent query access (e.g., as discussed with regard to FIGS. 4 and 5 below). Materialized view maintenance 120 may be implemented in order to ensure that local materialized view 130 is updated as changes to sources of the materialized view (e.g., other tables are updated).

As illustrated in FIG. 1, external table(s) stored as one or more data objects (e.g., files, partitions, or other data structures) in external data storage system 150 may be sources 131 for local materialized view 130. This may allow for systems 150 to act as a data lake, storing many different tables of file formats (which may not be native or supported by database system 110), but still accessible to make data available via local materialized view 130. Although external table(s) alone are depicted as source(s) 131 for local materialized view 130, in some embodiments additional sources, such as local tables within database system 110 may also be used along with external tables (e.g., joined as specified in a materialized view definition).

To ensure that materialized view maintenance 120 can keep local materialized view updated, a metadata 140 may be maintained. This metadata 140 may be transactionally derived, as indicated at 142 (as discussed in detail below). In this way, incremental materialized view updates (as opposed to generating local materialized view 130 again entirely) may be performed, allowing materialized view maintenance to get materialized view updates 146 directly from specific data objects of external table(s) 160 and then apply the updates 148. In this way, only those data objects (e.g., files) of an external may need to be scanned or otherwise evaluated to update local materialized view. This can achieve significant performance improvements as some external tables can be very large, and operations to scan entire external tables can be costly in terms of time and resources. For a frequently updated materialized view, such as local materialized view, implementing transactionally derived metadata for refreshing local materialized views with external table sources. As discussed in detail below with regard to FIGS. 5 and 6, transactionally derived updates to metadata 140 may allow for derived metadata to indicate when updates 144 to metadata are made (e.g., by evaluating transaction identifiers or other provenance information that tracks or describes a history changes to an external table's data objects).

Different metadata sources 170 may be used for derived metadata 140. For example, some file formats, such as transactional file formats, may maintain a manifest, or other type of file that describes or includes metadata, including the provenance of data objects (e.g., files) of an external table when changes are made. Another source 170 may be information obtained from external data storage system 150, such as directory and/or file information that describes, for example, when data objects are created, updated, and/or other provenance information for the data objects.

Please note that the previous description is a logical description and thus is not to be construed as limiting as to the implementation of a these features, or portions thereof.

This specification continues with a general description of a provider network that implements multiple different services, including a database service and storage service, which may transactionally derived metadata for refreshing local materialized views with external table sources for databases managed by the database service. Then various examples of the database service and storage service, including different components/modules, or arrangements of components/module that may be employed as part of implementing the services are discussed. A number of different methods and techniques to implement s transactionally derived metadata for refreshing local materialized views with external table sources for databases managed by the database service are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
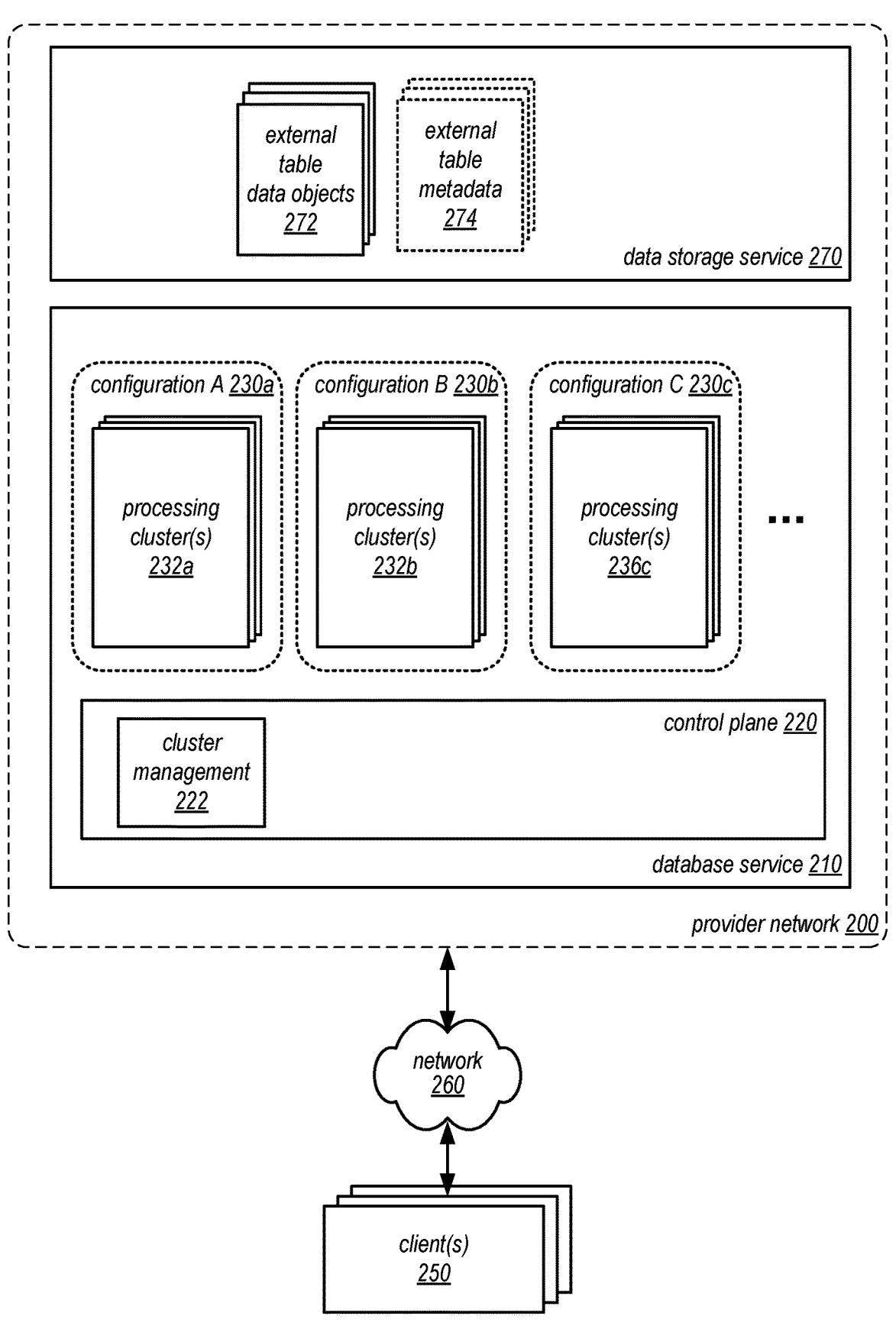
FIG. 2 is a logical block diagram illustrating a provider network offering a database service that implements transactionally derived metadata for refreshing local materialized views with external table sources for databases managed by the database service, according to some embodiments.

FIG. 2 is a logical block diagram illustrating a provider network offering a database service that implements transactionally derived metadata for refreshing local materialized views with external table sources for databases managed by the database service, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Database users can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of database users within a certain latency requirement, a set of servers provided to a database user's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to database users on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes database user resources that are implemented on the cloud provider network (e.g., computing instances, containers, block storage volumes, databases, file storage). Data plane traffic generally includes non-administrative operations such as transferring database user data to and from the database user resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, graph database, time series database, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be (or included in) various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database systems that are highly scalable and extensible. Queries may be directed to a database in database service 210 that is distributed across multiple physical resources, and the resource configurations, such as processing clusters 232, used to process the queries may be scaled up or down on an as needed basis, as discussed in detail below with regard to FIGS. 3-7.

Database service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 2210 may be a data warehouse service. Thus in the description that follows database service 210 may be discussed according to the various features or components that may be implemented as part of a data warehouse service, including control plane 220, and processing clusters 232. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 8. Different subsets of these computing devices may be controlled by control plane 220. Control plane 220, for example, may provide a cluster control interface to clients or users who wish to interact with the processing clusters, such as processing cluster(s) 232a, 232b, and 232c managed by control plane 220. For example, control plane 220 may generate one or more graphical user interfaces (GUIs) for clients, which may then be utilized to select various control functions offered by the control interface for the processing clusters 232 hosted in the database service 210. Control plane 220 may provide or implement access to various metrics collected for the performance of different features of database service 210, including processing cluster performance, in some embodiments.

As discussed above, various clients (or database users, organizations, entities, or users) may wish to store and manage data using a database service 210. Processing clusters 232 may respond to various requests, including write/update/store requests (e.g., to write data into storage) or queries for data (e.g., such as a Server Query Language request (SQL) for particular data), as discussed below with regard to FIGS. 3 and 5. For example, multiple users or clients may access a processing cluster to obtain data warehouse services.

For databases manually managed by users, database service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing clusters 232 that are attached to the database for query processing. For instance, a client may be given the network endpoint "http://mycluster.com" to send various request messages to. Multiple clients (or users of a particular client) may be given a database endpoint for the same database. Various security features may be implemented to prevent unauthorized users from accessing the databases.

Processing clusters, such as processing clusters 232a, 232b, and 232c, hosted by database service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, external table data objects 272 and, in some scenarios external table metadata 274, may not be stored locally in a processing cluster 232 but instead may be stored in data storage service 270 (e.g., with data being partially or temporarily stored in processing cluster 232 to perform queries). Queries sent to a processing cluster 23 (or routed/redirect/assigned/allocated to processing cluster(s)) may be directed to local data stored in the processing cluster and/or remote data. Therefore, processing clusters may implement local data processing, such as local data processing, (discussed below with regard to FIG. 5) to plan and execute the performance of queries with respect to local data in the processing cluster, as well as a remote data processing client.

Database service 210 may implement different types or configurations of processing clusters. For example, different configurations A 230a, B 230b, and C 230c, may utilize various different configurations of computing resources, including, but not limited to, different numbers of computational nodes, different processing capabilities (e.g., processor size, power, custom or task-specific hardware, such as hardware optimized to perform different operations, such as regular expression searching, or other data processing operations), different amounts of memory, different networking capabilities, and so on. Thus, for some queries, different configurations 230 of processing cluster 232 may offer different execution times. Different configurations 230 of processing clusters 232 may be maintained in different pools of available processing clusters to be attached to a database. Attached processing clusters may then be made exclusively assigned or allocated for the use of performing queries to the attached database, in some embodiments. The number of processing clusters 232 attached to a database may change over time according to the selection techniques discussed below.

In some embodiments, database service 210 may have at least one processing cluster attached to a database, which may be the "primary cluster" or "main cluster." Primary clusters 330 may be reserved, allocated, permanent, or otherwise dedicated processing resources that store and/or provide access to a database for a client, in some embodiments. Primary clusters, however, may be changed. Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity for a primary cluster. Control plane 220 may manage cluster pools by managing the size of cluster pools (e.g., by adding or removing processing clusters based on demand).

As databases are created, updated, and/or otherwise modified, snapshots, copies, or other replicas of the database at different states may be stored separate from database service 210 in data storage service 250, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object.

In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, format independent data processing service 220 may access data objects stored in data storage services via the programmatic interfaces.

Generally speaking, clients 250 may encompass any type of client that can submit network-based requests to provider network 200 via network 260, including requests for storage services (e.g., a request to query a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, format independent data processing service 220, and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
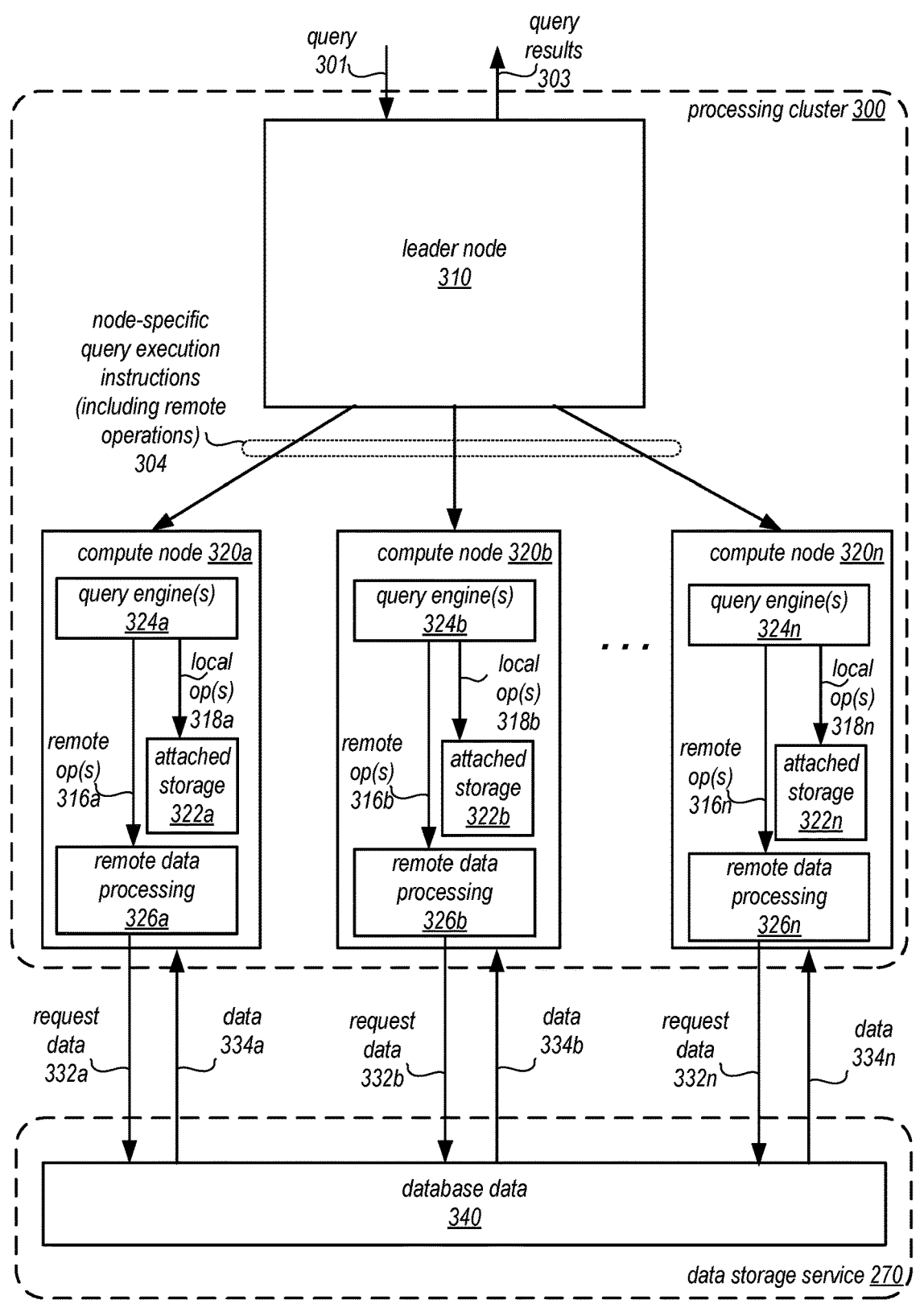
FIG. 3 is a logical block diagram illustrating an example processing cluster of a database service, according to some embodiments.

FIG. 3 is a logical block diagram illustrating an example processing cluster of a database service, according to some embodiments. Processing cluster 300 may be query processing cluster, like processing clusters 232 discussed above with regard to FIG. 2, that distributes execution of a query among multiple computational (which may also be referred to as "compute") nodes. As illustrated in this example, a processing cluster 300 may include a leader node 310 and compute nodes 320a, 320b, and 320n, which may communicate with each other over an interconnect (not illustrated). Leader node 310 may implement query planning 312 to generate query plan(s), query execution 314 for executing queries on processing cluster 300 that perform data processing that can utilize remote query processing resources for remotely stored data (e.g., by utilizing one or more query execution slot(s)/queue(s) 317). As described herein, each node in a processing cluster 300 may include attached storage, such as attached storage 322a, 322b, and 322n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 300 is a leader node as illustrated in FIG. 3, but rather different nodes of the nodes in processing cluster 300 may act as a leader node or otherwise direct processing of queries to data stored in processing cluster 300. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2. For example, leader node 310 may communicate with a proxy service and may receive query 301 and return query results 303 to proxy service 240 (instead of communicating directly with a client application). Alternatively, in those embodiments where leader node 310 implements database query queue and query routing as a primary cluster, then leader node 310 may act as the proxy for other, secondary clusters, attached to the database, and may return query results directly to a client application.

Leader node 310 may be a node that receives a query 301 from various client programs (e.g., applications) and/or subscribers (users) (either directly or routed to leader node 310 from a proxy service), then parses them and develops an execution plan (e.g., query plan(s)) to carry out the associated database operation(s)). More specifically, leader node 310 may develop the series of steps necessary to obtain results for the query. Query 301 may be directed to data that is stored both locally within processing cluster 300 (e.g., at one or more of compute nodes 320) and data stored remotely. Leader node 310 may also manage the communications among compute nodes 320 instructed to carry out database operations for data stored in the processing cluster 300. For example, node-specific query instructions 304 may be generated or compiled code by query execution 314 that is distributed by leader node 310 to various ones of the compute nodes 320 to carry out the steps needed to perform query 301, including executing the code to generate intermediate results of query 301 at individual compute nodes may be sent back to the leader node 310. Leader node 310 may receive data and query responses or results from compute nodes 320 in order to determine a final result 303 for query 301.

A database schema, data format and/or other metadata information for the data stored among the compute nodes, such as the data tables stored in the cluster, may be managed and stored by leader node 310. Query planning may account for remotely stored data by generating node-specific query instructions that include remote operations to be directed by individual compute node(s). As illustrated in FIG. 3, processing cluster 300 could be a "primary" cluster that may send requests to an additional cluster for the database, as indicated at 313 in order to scale query performance (as discussed below with regard to FIG. 5). Alternatively, if processing cluster 300 were a "secondary" processing cluster, then as illustrated at 311, additional requests may be received from the additional cluster (instead of query 301 and query results 303).

Processing cluster 300 may also include compute nodes, such as compute nodes 320a, 320b, and 320n. Compute nodes 320, may for example, be implemented on servers or other computing devices, such as those described below with regard to computer system 1000 in FIG. 8, and each may include individual query processing "slices" defined, for example, for each core of a server's multi-core processor, one or more query processing engine(s), such as query engine(s) 324a, 324b, and 324n, to execute the instructions 304 or otherwise perform the portions of the query plan assigned to the compute node. Query engine(s) 324 may access a certain memory and disk space in order to process a portion of the workload for a query (or other database operation) that is sent to one or more of the compute nodes 320. Query engine 324 may access attached storage, such as 322a, 322b, and 322n, to perform local operation(s), such as local operations 318a, 318b, and 318n. For example, query engine 324 may scan data in attached storage 322, access indexes, perform joins, semi joins, aggregations, or any other processing operation assigned to the compute node 320.

Query engine 324a may also direct the execution of remote data processing operations, by providing remote operation(s), such as remote operations 316a, 316b, and 316n, to remote data processing clients, such as remote data processing client 326a, 326b, and 326n. Remote data processing clients 326 may be implemented by a client library, plugin, driver or other component that sends request subqueries to be performed by data storage service 220 or requests to for data, 332a, 332b, and 332n. As noted above, in some embodiments, Remote data processing clients 326 may read, process, or otherwise obtain data 334a, 334b, and 334c, in response from database data 340 in data storage service 270, which may further process, combine, and or include them with results of location operations 318.

Compute nodes 320 may send intermediate results from queries back to leader node 310 for final result generation (e.g., combining, aggregating, modifying, joining, etc.). Remote data processing clients 326 may retry data requests 332 that do not return within a retry threshold.

Attached storage 322 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
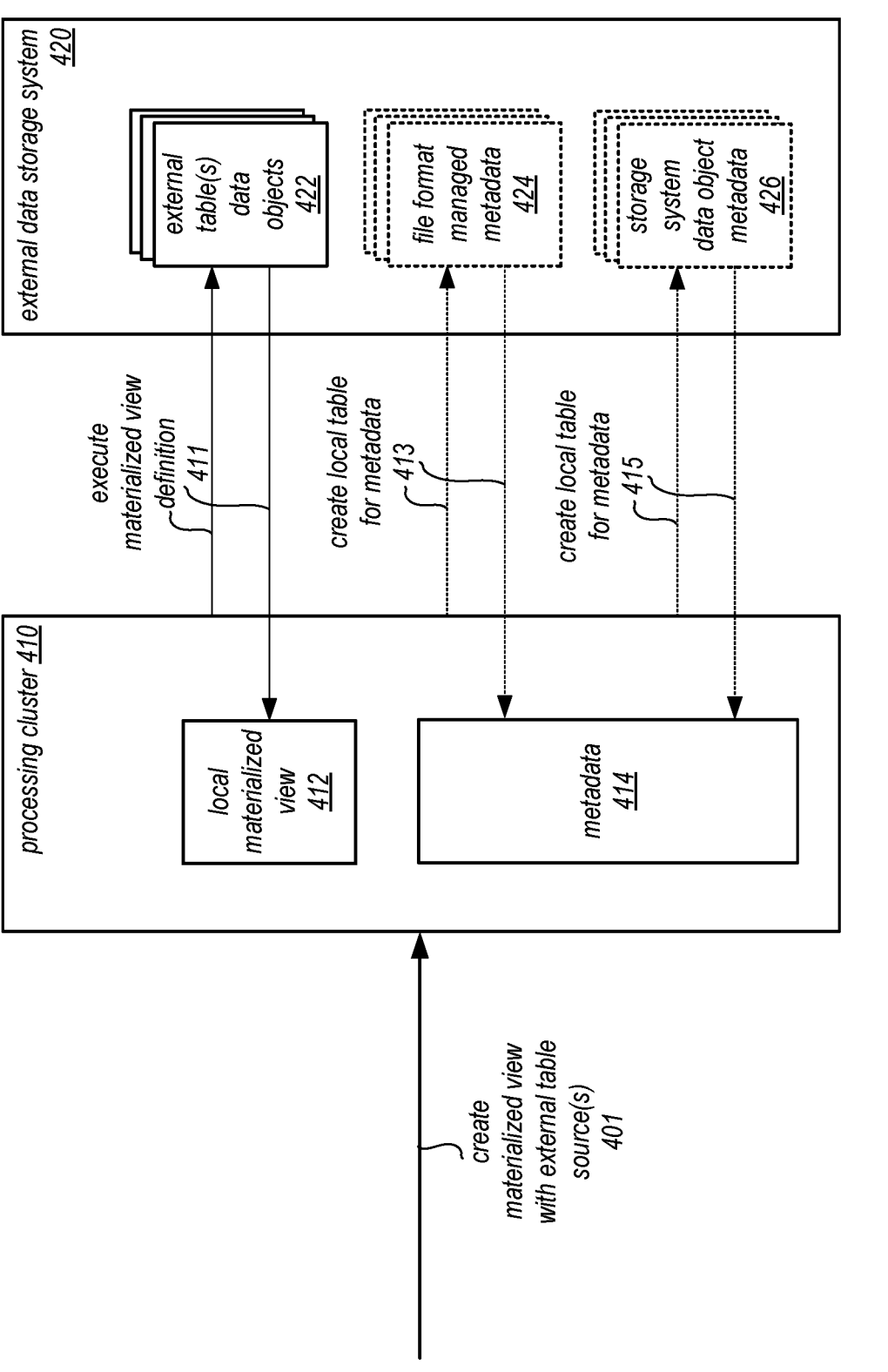
FIG. 4 is a logical block diagram illustrating a request to create a local materialized view from external table sources, according to some embodiments.

FIG. 4 is a logical block diagram illustrating a request to create a local materialized view from external table sources, according to some embodiments. Processing cluster 410, similar to processing cluster 310 and 510 below, may receive a request to create a materialized view from external table sources, as indicated at 401. For example, the request may identify the external tables in a materialized view definition (e.g., in a query language, such as SQL) which may select, filter, join, operate upon (e.g., aggregate functions, such as sum or average) data into local materialized view. Processing cluster 410 may execute the materialized view definition, as indicated at 411, in order to access external table data object(s) 422 in external data storage system 420 (e.g., using remote operation as discussed above with regard to FIG. 3).

In addition creating local materialized view 412, processing cluster may create metadata 414. In some embodiments, metadata 414 may be stored as a table similar to other user data tables, such as local materialized view or other tables, but hidden or managed as a system table. To create metadata, as indicated at 413 and 415, one or more sources in external data storage system 420 may be accessed in order to create the corresponding rows or entries in a local table that include various information such as, access information, including file paths or other storage locations, names or descriptions of the contents, transaction identifiers, among other information. For example, an entry may identify when a data object was created, another entry may identify if the data object was deleted, and so on. In this way, metadata 414 may maintain the provenance of each of external table(s) data object(s) 422.

File format managed metadata 424 may include the information that may be maintained or updated according to the file format of the external data objects, such as transactional file format. Other information may be accessed in addition to or instead of (e.g., if file format managed metadata does not exist because of a non-transactional file format being used), such as storage system data object metadata 426. Storage system data object metadata 426 may include metadata maintained by external data storage system 420, which can be used to derive or otherwise create metadata 414.

For example, consider metadata of an external table that stores different geographic data partitioned according to region (e.g., Europe, America, Asia). The metadata that may be stored in the local table could be:

TABLE 1

| oid | insertxid | deletexid | partition_1 | partition_ | . . . | $path | $etag | $size |
|---|---|---|---|---|---|---|---|---|
| 1 | 1000 | 922337 | Europe | . . . | | U://europe/file_1 | 3sL4k | 2048 |
| 2 | 1000 | 922337 | America | . . . | | U://america/file_1 | pXroD | 1024 |
| 3 | 1001 | 922337 | Europe | . . . | | U://europe/file_2 | qtJlc | 256 |

In this example, columns oid, insertxid and deletexid may be system attributes for the external tables. Partition columns may be part of the metadata and represented in relational form. Each pair ($path, $etag) pay be a pointer to a data file in the external storage containing tuples that are conceptually nested. Specifically, $etag can encode the object's ETag and can be expected to be present only for some file formats. The $etag column may have different semantics for other table formats. Column $size may be used to parallelize scans of external files, in some embodiments.

Transactional table formats may already encode system attributes oid, insertxid and deletexid. For non-transactional file formats, they can be defined when taking snapshots on the external table. Operations on partitions or data files can be replicated as local transactions. For example, the newly observed snapshot (xid 1002) could have removed a partition along with its data file (oid 2) and added some other partition or data file, such as:

| oid | insertxid | deletexid | partition_1 | partition _ | . . . | $path | $etag | $size |
|---|---|---|---|---|---|---|---|---|
| 1 | 1000 | 922337 | Europe | . . . | | U://europe/file_1 | 3sL4k | 2048 |
| 2 | 1000 | 1002 | America | . . . | | U://america/file_1 | pXroD | 1024 |
| 3 | 1001 | 922337 | Europe | . . . | | U://europe/file_2 | qtJlc | 256 |
| 4 | 1002 | 922337 | Asia | . . . | | U://asia/file_1 | x = 7D5 | 512 |

Figure 5:
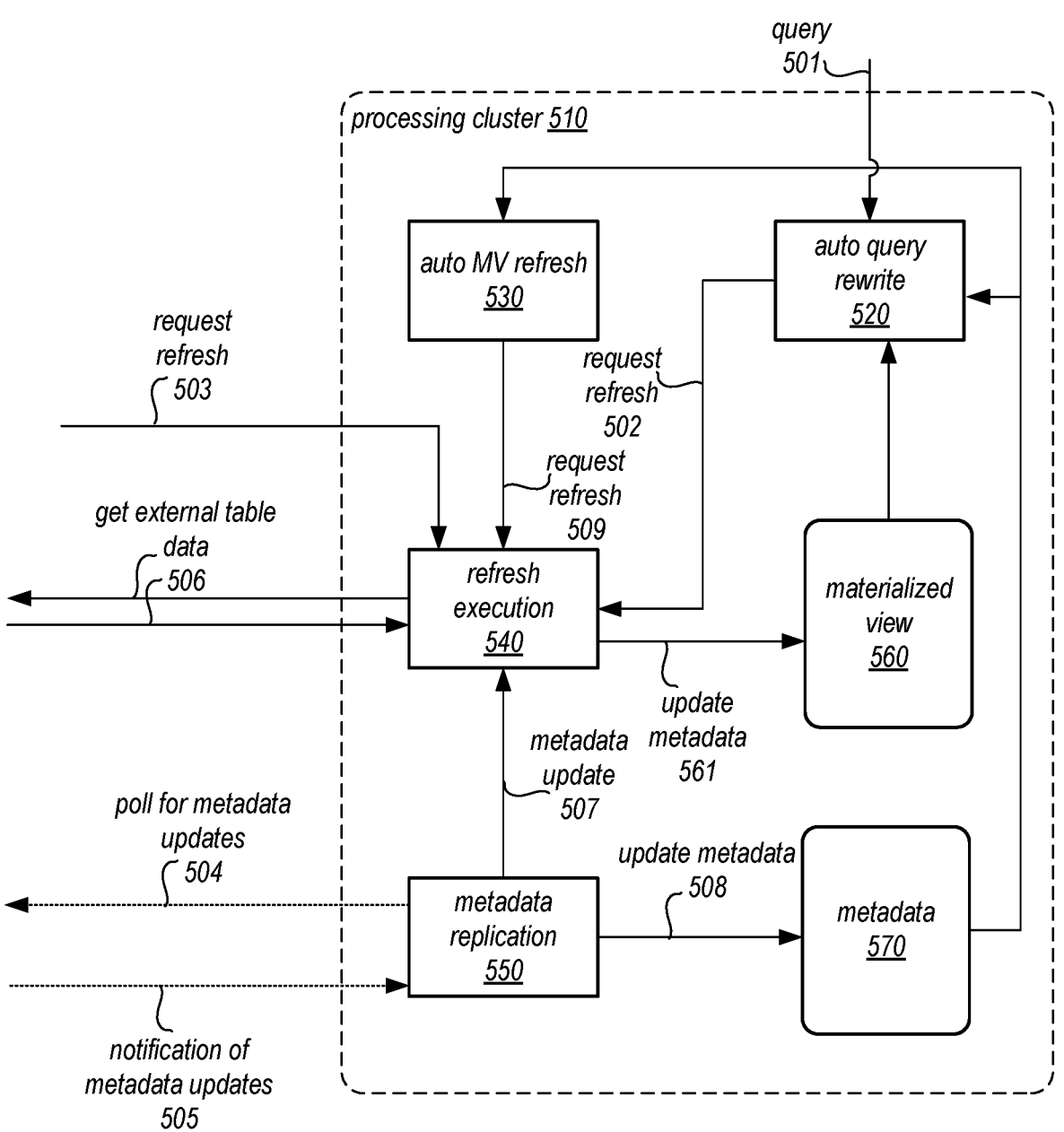
FIG. 5 is a logical block diagram illustrating interactions for different updates to local metadata and local materialized views, according to some embodiments.

FIG. 5 is a logical block diagram illustrating interactions for different updates to local metadata and local materialized views, according to some embodiments. Processing cluster 510 may have a materialized view 560 which is sourced from external tables (and possibly local tables, not illustrated) described by metadata 570. Different scenarios may cause materialized view updates, as discussed below with regard to FIGS. 6 and 7. For example, a query 501 may be received. As part of processing, auto query rewrite 520 may identify materialized view 560 which can be used to improve performance of query 501 (e.g., by accessing data used to generate the result of query 501). However, auto query rewrite 520 may also determine that materialized view 560 is stale, requesting a refresh, as indicated at 502. In another example, auto MV refresh 530 may evaluate various materialized views, including materialized view 560 to determine that it should be refreshed (e.g., based on a latest transaction identifier and send a refresh request 509.

A manual request to refresh 503 may also be received. Refresh execution 540 may handle performing a refresh operation, by getting external table data 506 and making corresponding updates 561 to materialized view 560. However, first updates to metadata may be determined 507 in order to indicate the correct data to obtain. These updates may be obtained by various techniques, including polling, as indicated at 504 or receiving notifications 505. Updates, as indicated 508 may be made so that metadata 507 can be used for query execution and subsequent refresh operations.

Polling techniques 504 for metadata may include sending periodic requests to external data storage systems for an external table in order to ascertain whether metadata 570 should be updated. Different techniques for making these requests are discussed in detail below with regard to FIG. 7, such as using access requests to obtain a snapshot of metadata information or to perform a delta query. A notification of updates 505 may include techniques where a listener system or device (not illustrated) may receive events or other notifications of when a change to an external table is made (e.g., a file is added). Then, the notification may be forwarded to metadata replication 550, which may perform techniques to obtain the update to the metadata (if not provided by the notification).

Although FIGS. 2-5 have been described and illustrated in the context of a provider network implementing a database service, like a data warehousing service, the various components illustrated and described in FIGS. 2-5 may be easily applied to other database services that can utilize transactionally derived metadata for refreshing local materialized views with external table sources. As such, FIGS. 2-5 are not intended to be limiting as to other embodiments of transactionally derived metadata for refreshing local materialized views with external table sources.

FIG. 6 is a high-level flowchart illustrating methods and techniques to implement transactionally derived metadata for refreshing local materialized views with external table sources, according to some embodiments. Various different data processing systems and devices may implement the various methods and techniques described below, either singly or working together. For instance, different types of database systems may implement these techniques. Alternatively, various other combinations of different systems and devices located within or without provider networks may implement the below techniques. Therefore, the above examples and or any other systems or devices referenced as performing the illustrated method, are not intended to be limiting as to other different components, systems, or devices.

As indicated at 610, a database system may identify an update to metadata that is transactionally derived for one or more external tables stored in an external data storage system, in some embodiments. The external table(s) may be a source for a local materialized view maintained by the database system. In some embodiments, the identification may be triggered, caused, or otherwise performed in response to a detected refresh event, as discussed below with regard to FIG. 7. In some embodiments, the identification may be performed by periodically checking for updates to the local copy of the metadata.

As indicated at 620, a determination may be made as to which storage objects storing respective portions of the external table(s) in the external data storage system to access according to the identified update to the local copy of the metadata, in some embodiments. For example, the local copy of the metadata may identify various data files, partitions, or other storage structures to access, as rows or entries corresponding to different transactions performed to update the metadata, in some embodiments, providing the provenance of the files. File paths, object identifiers, credentials, and/or any other information that may be used by database system to access the portion(s) of the external table(s) may be included in the metadata, in some embodiments.

As indicated at 630, the local materialized view maintained by the database may be updated according to the accessed portion(s) of the external table(s), in some embodiments. For example, the portions may include new rows that have been added or values in existing rows that have been modified. In some embodiments, the accessed portions may indicate that rows have been deleted (e.g., by tombstone or other markers for deletion). Corresponding updates to the local materialized view may be made. For example, a materialized view definition (e.g., specified as query in a query language, such as SQL) may be used to evaluate the accessed portions to regenerate the materialized view. In at least some embodiments, delta or incremental maintenance operations may be performed so that only portions of the local materialized view that need to be changed (e.g., to add/modify/remove values) are updated.

Figure 7:
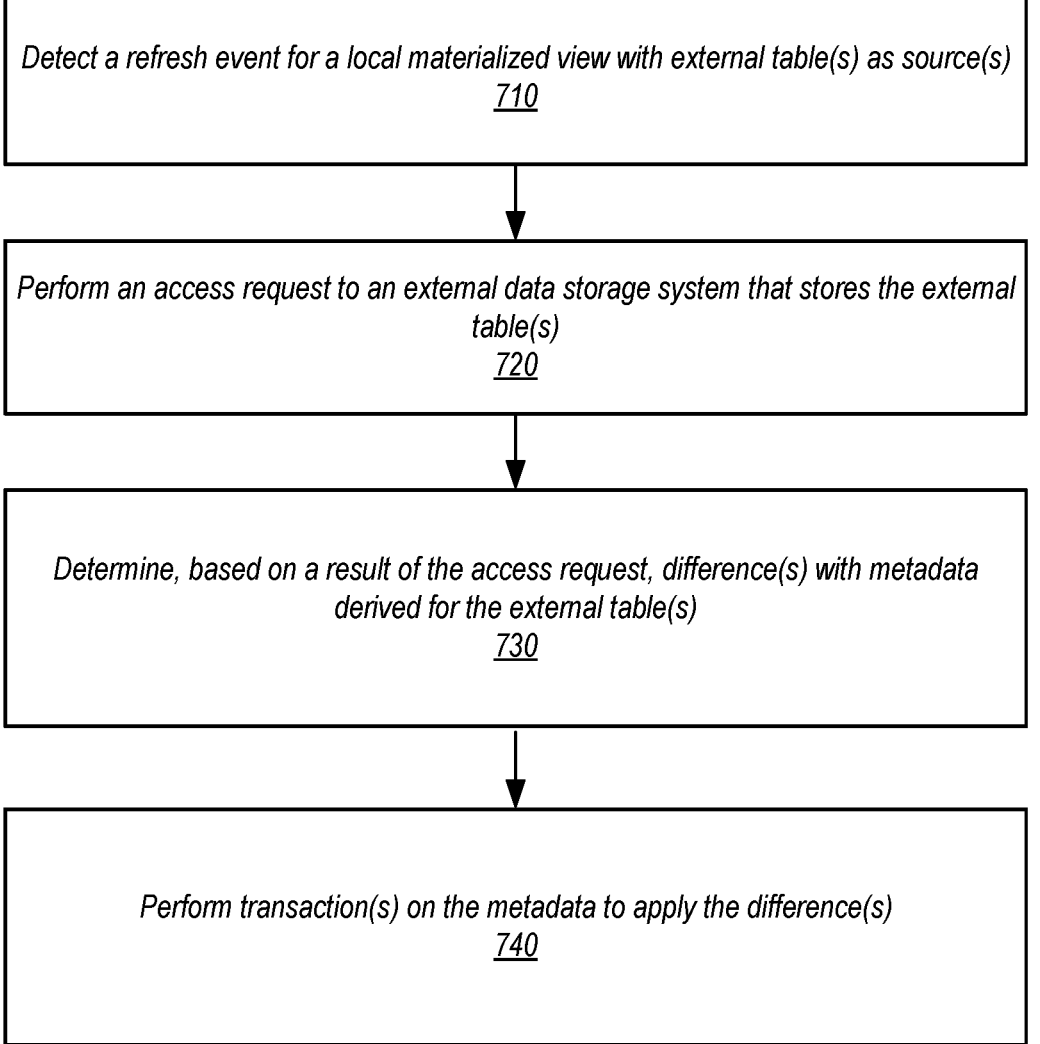
FIG. 7 is a high-level flowchart illustrating methods and techniques to implement performing transactional replication to update a local copy of metadata for external tables of a materialized view, according to some embodiments.

FIG. 7 is a high-level flowchart illustrating methods and techniques to implement performing transactional replication to update a local copy of metadata for external tables of a materialized view, according to some embodiments. As indicated at 710, a refresh event for a local materialized view may be detected, in some embodiments. For example, the refresh event may be a request received (e.g., from a client) to refresh a materialized view, in some embodiments. A refresh event may be triggered by a background process that evaluates existing local materialized views for staleness and instructs/requests stale materialized views to be refreshed, in some embodiments. A refresh event may be triggered by query that specifies the materialized view, or is rewritten to make use of the materialized view, in some embodiments.

As indicated at 720, an access request may be performed to metadata for the external table source(s) to an external data storage system that stores the external table(s) and the metadata, in some embodiments. For example, the access request may be a request to obtain a latest snapshot of the metadata from the external data storage system. In other embodiments, the request may be a delta query that includes, as a predicate or feature of the query, a latest transaction identifier for the local copy of the metadata in order to return only those changes to the metadata that occur after the latest transaction identifier.

As indicated at 730, a determination may be made based on a result of the access request, of the differences between a local copy of the metadata and the metadata in the external data storage system, in some embodiments. For example, the results of the delta query may provide the differences as they may be later than a latest transaction identifier for the local copy of the metadata. For an access request that returns the latest snapshot, a comparison of transaction identifiers (or other changes if the local copy of the metadata stores the metadata in a different format) may be performed to determine the difference(s).

If there are difference(s), then transaction(s) on the local copy of the metadata to replicate the difference(s), in some embodiments. For example, requests to insert new rows, modify existing rows, or delete existing rows, may be performed as a transaction, using transaction semantics to ensure that they are performed correctly and appropriately exposed to readers of the local copy of the metadata (e.g., uncommitted transactions should not be made visible to readers of the local copy of the metadata). Transaction identifiers may be included as part of the entries for subsequent evaluation according to the various techniques discussed above.

Embodiments of transactionally derived metadata for refreshing local materialized views with external table sources as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 8:
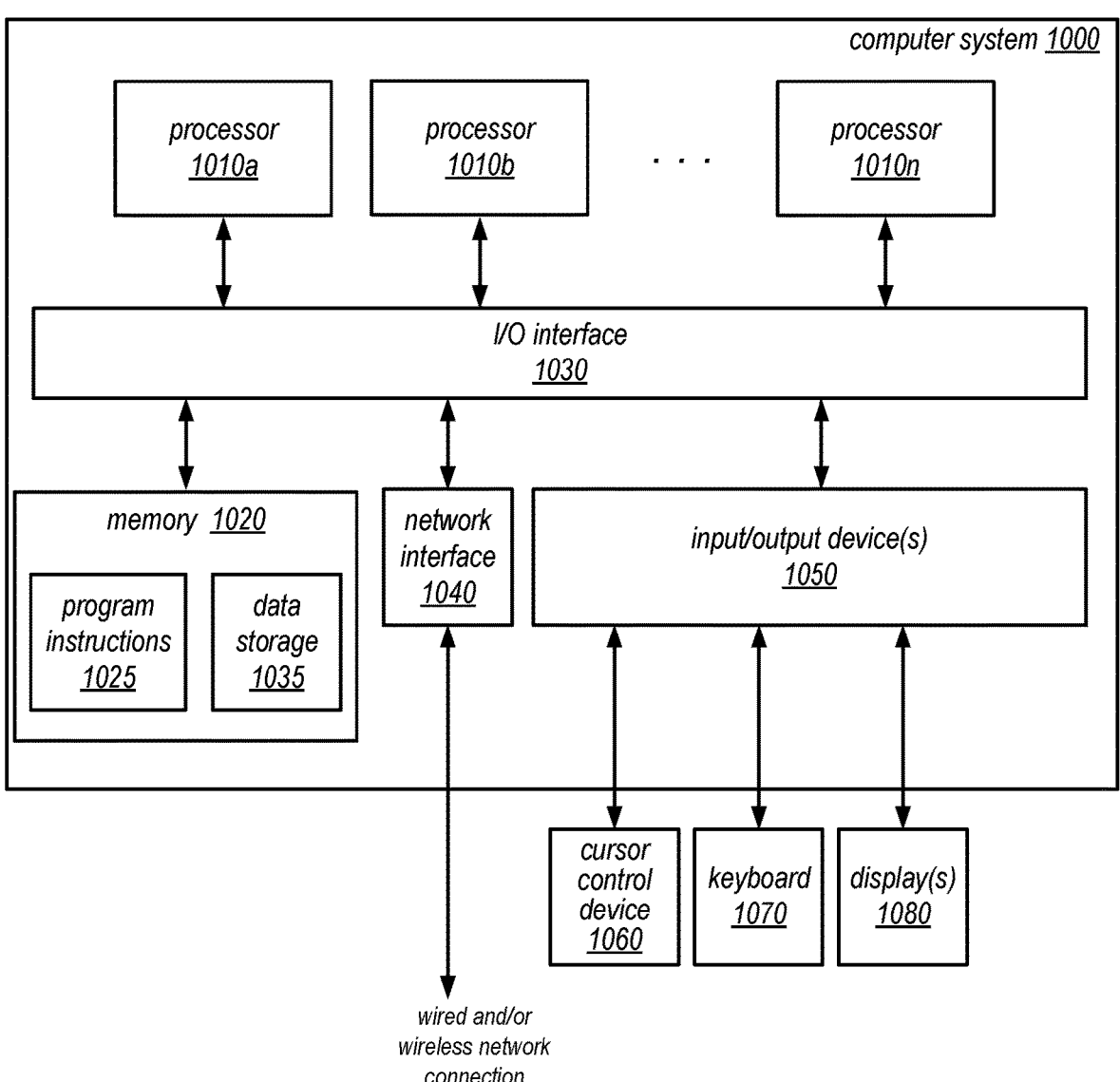
FIG. 8 illustrates an example system that implements the various methods, techniques, and systems described herein, according to some embodiments.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

a plurality of computing devices, respectively comprising at least one processor, and a memory storing program instructions that when executed by at least a subset of the plurality of computing devices implement a processing cluster of a database service of a provider network, the processing cluster to:

evaluate transaction identifiers for different entries in a local table of metadata that is transactionally derived for one or more external tables stored in an external data storage system to identify an update to the metadata, wherein the one or more external tables are a source for a local materialized view maintained by the processing cluster, wherein the metadata comprises a provenance of different data objects storing different portions of the one or more external tables;

determine one or more data objects of the different data objects in the external data storage system to access according to one or more entries in the local table of the metadata that correspond to the identified one or more data objects; and access the one or more data objects in the external data storage system to determine one or more updates to the local materialized view; and apply the determined one or more updates to the local materialized view maintained by the processing cluster according to the accessed one or more data objects storing the different portions of the one or more external tables.

2. The system of claim 1, wherein the processing cluster is further to:

determine, based on a result of an access request to the external data storage system, one or more differences with the metadata; and perform one or more transactions on the local table storing the metadata to apply the one or more differences.

3. The system of claim 1, wherein the processing cluster is further to detect an event to refresh the local materialized view, wherein the detection of the event to refresh causes the processing cluster to perform the evaluation of the transaction identifiers.

4. The system of claim 1, wherein the database service is a data warehouse service, wherein the external data storage system is another service of the provider network that implements a data lake supporting a plurality of different file formats for external tables that are not native to the data warehouse service, and wherein the plurality of different file formats include transactional file formats and non-transactional file formats.

5. A method, comprising:

identifying, by a database system, an update to metadata that is transactionally derived for one or more external tables stored in an external data storage system, wherein the one or more external tables are a source for a local materialized view maintained by the database system;

determining, by the database system, one or more data objects storing respective portions of the one or more external tables in the external data storage system to access according to the identified update to the local copy of the metadata; and updating, by the database system, the local materialized view maintained by the database system according to the accessed one or more data objects storing the respective portions of the one or more external tables.

6. The method of claim 5, further comprising:

determining, by the database system, based on a result of an access request to the external data storage system of the one or more external tables stored, one or more differences with the metadata; and performing, by the database system, one or more transactions on the metadata to apply the one or more differences.

7. The method of claim 6, wherein the access request is a delta query that obtains the differences based on latest transaction identifier of the metadata.

8. The method of claim 6, wherein the access request obtains a latest snapshot of external metadata in the external data storage system for comparison with the metadata.

9. The method of claim 5, further comprising detecting, by the database system, a refresh event that causes performance of the identifying of the update to the metadata.

10. The method of claim 9, wherein the refresh event is a request to refresh the local materialized view received at the database system.

11. The method of claim 9, wherein the refresh event is a received query that is rewritten to use the local materialized view received at the database system and results in a determination that the local materialized view is stale.

12. The method of claim 9, wherein the refresh event is a notification of an update having been applied to the external table in the external data storage system that causes performance of the identifying of the update to the metadata.

13. The method of claim 5, wherein the external data storage system is a service of a provider network that implements a data lake supporting a plurality of different file formats for external tables that are not native to the database system and wherein the plurality of different file formats include transactional file formats and non-transactional file formats.

14. One or more non-transitory, computer-readable storage media, storing program instructions that when executed on or across one or more computing devices cause the one or more computing devices to implement:

detecting, by a database system, an update to metadata that is transactionally derived for one or more external tables stored in an external data storage system, wherein the one or more external tables are a source for a local materialized view maintained by the database system;

determining, by the database system, one or more data objects storing respective portions of the one or more external tables in the external data storage system to access according to the detected update to the local copy of the metadata; and updating, by the database system, the local materialized view maintained by the database system according to the accessed one or more data objects storing the respective portions of the one or more external tables.

15. The one or more non-transitory, computer-readable storage media of claim 14, storing further program instructions that when executed on or across the one or more computing devices, cause the one or more computing devices to further implement:

determining, by the database system, based on a result of an access request to the external data storage system, one or more differences with the metadata; and performing, by the database system, one or more transactions on the metadata to apply the one or more differences.

16. The one or more non-transitory, computer-readable storage media of claim 14, storing further program instructions that when executed on or across the one or more computing devices, cause the one or more computing devices to further implement detecting, by the database system, a refresh event that causes performance of the identifying of the update to the metadata.

17. The one or more non-transitory, computer-readable storage media of claim 16, wherein the refresh event is a request to refresh the local materialized view received at the database system.

18. The one or more non-transitory, computer-readable storage media of claim 16, wherein the refresh event is detected by a background process that evaluates materialized views at the database system for staleness.

19. The one or more non-transitory, computer-readable storage media of claim 16, wherein the refresh event is a notification of a corresponding update having been applied to the external table in the external data storage system that causes performance of the identifying of the update to the metadata.

20. The one or more non-transitory, computer-readable storage media of claim 14, wherein the database system is a database service implemented as part of a provider network, wherein the external data storage system is another service of the provider network that implements a data lake supporting a plurality of different file formats for external tables that are not native to the database system, and wherein the plurality of different file formats include transactional file formats and non-transactional file formats.

* * * * *